United States Patent
Meng et al.

(10) Patent No.: US 12,418,617 B2
(45) Date of Patent: Sep. 16, 2025

(54) PRINT CONTROL DEVICE

(71) Applicant: Guangzhou Pulisi Technology Co., Ltd., Guangdong (CN)

(72) Inventors: Zhenhua Meng, Guangdong (CN); Shengwang Liu, Guangdong (CN); Xiaobo Lin, Guangdong (CN); Lu Liu, Guangdong (CN)

(73) Assignee: Guangzhou Pulisi Technology Co., Ltd., Guangzhou (CN)

( * ) Notice: Subject to any disclaimer, the term of this patent is extended or adjusted under 35 U.S.C. 154(b) by 77 days.

(21) Appl. No.: 18/386,264

(22) Filed: Nov. 2, 2023

(65) Prior Publication Data
US 2024/0155059 A1    May 9, 2024

(30) Foreign Application Priority Data
Nov. 4, 2022    (CN) .......................... 202211377363.8

(51) Int. Cl.
*H04N 1/00* (2006.01)

(52) U.S. Cl.
CPC ..... *H04N 1/00029* (2013.01); *H04N 1/00074* (2013.01); *H04N 1/00615* (2013.01)

(58) Field of Classification Search
USPC ...................................................... 358/1.15
See application file for complete search history.

(56) References Cited

U.S. PATENT DOCUMENTS

| | | | | |
|---|---|---|---|---|
| 4,179,223 A | * | 12/1979 | Kwan | ...................... B41J 19/14 400/279 |
| 8,043,015 B1 | * | 10/2011 | Bledsoe | ..................... B41J 3/36 400/279 |

FOREIGN PATENT DOCUMENTS

| | | |
|---|---|---|
| CN | 114924321 A | 8/2022 |
| CN | 217574586 U | 10/2022 |

\* cited by examiner

*Primary Examiner* — Jacky X Zheng

(57) ABSTRACT

A print control device comprises a linear modular component, a driving mechanism, and at least one guide rail. The guide rail and the linear modular component are arranged in parallel, and the driving mechanism is disposed on one end of the linear modular component. A group of sensors are respectively disposed at two ends of the linear modular component. The driving mechanism is configured to: control a print device disposed on the linear modular component to move along the guide rail in a predefined direction. The group of sensors are configured to: detect a position relationship between the print device and the sensor. If the print device arrives at the position of the sensor located in the predefined movement direction, the sensor located in the predefined movement direction stops sending the sensing signal to the driving mechanism, such that the driving mechanism controls the print device to stop movement.

9 Claims, 1 Drawing Sheet

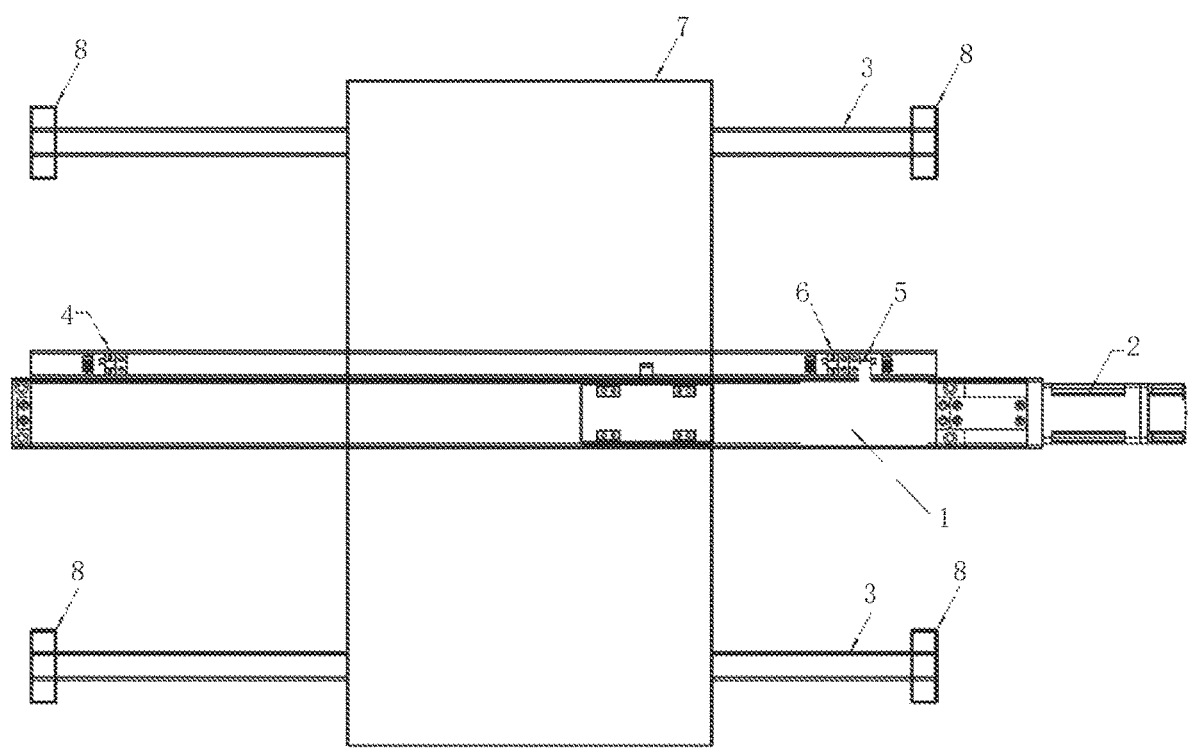

PRINT CONTROL DEVICE

CROSS REFERENCE TO RELATED APPLICATIONS

The present application claims the benefit of Chinese Patent Application No. 202211377363.8 filed on Nov. 4, 2022, the contents of which are incorporated herein by reference in their entirety.

TECHNICAL FIELD

The disclosure relates to the technical field of printing, and more particularly to a print control device.

BACKGROUND

With the improvement of living standards, print devices are more and more widely used.

Existing print control devices usually provide a print device mounted on guide rails and connected with a linear modular component. They drive the linear modular component by means of a driving mechanism, so as to control the print device to move along the guide rails to perform printing. They are usually provided with sensors at two ends of the linear modular component, to sense the position of the print device. Furthermore, once they sense the print device arrives at the position of any one of the sensors, they send a deactivation signal to the driving mechanism, enabling the driving mechanism to control the print device to stop moving based on the deactivation signal. That is, existing print control devices control the print device to stop movement only when sensing the print device arrives at a position corresponding to the sensor based on receipt of the deactivation signal, such that the driving mechanism may keep controlling the print device to move and even over travel in the event of a sensor failure and thus raise the risk of damage to the print device.

SUMMARY

In order to solve the technical problem of existing print control devices which control the print device to stop movement only when sensing the print device arrives at a position corresponding to the sensor based on receipt of the deactivation signal such that the driving mechanism may keep controlling the print device to move and even over travel in the event of a sensor failure and thus raise the risk of damage to the print device.

The disclosure provides a print control device which comprises:
  a linear modular component, a driving mechanism, and at least one guide rail;
  wherein the guide rail and the linear modular component are arranged in parallel, and the driving mechanism is disposed on one end of the linear modular component,
  a group of sensors including a first sensor and a second sensor are disposed on the linear modular component,
  wherein the first sensor and the second sensor are respectively disposed at two ends of the linear modular component;
  wherein the driving mechanism is configured to:
  control a print device disposed on the linear modular component to move along the guide rail in a predefined direction; and
  wherein the group of sensors are configured to:
  detect a position relationship between the print device and the sensor located in the predefined movement direction during movement of the print device in the predefined movement direction; if the print device does not arrive at a position of the sensor located in the predefined movement direction, continuously send sensing signals to the driving mechanism and enable the driving mechanism to control the print device to move in the predefined movement direction; and if the print device arrives at the position of the sensor located in the predefined movement direction, the sensor located in the predefined movement direction stops sending the sensing signals to the driving mechanism and enable the driving mechanism to control the print device to stop moving.

Furthermore, the linear modular component may further comprise a third sensor disposed between the first sensor and the second sensor, and a distance between the third sensor and the second sensor is a predefined value.

Furthermore, the driving mechanism may be further configured to:
  control the print device to move towards the second sensor if receiving the sensing signal sent from the third sensor when the print device is activated, and control the print device to move towards the third sensor when the print device arrives at a position of the second sensor; and
  when the third sensor stops sending the sensing signal to the driving mechanism, control the print device to stop moving and then take a position of the third sensor as an initial printing position to start printing.

Furthermore, the driving mechanism may be further configured to:
  if not receiving the sensing signal sent from the third sensor when the print device is activated, determine the third sensor is faulty or not;
  if the third sensor is determined to be faulty, control the print device to move to the position of the first sensor or the second sensor, and then control the print device to move based on a movement instruction input by a user;
  if the third sensor is determined to be not faulty, control the print device to move a predefined distance towards the first sensor, then move towards the second sensor until arriving at the position of the third sensor such that the third sensor stops sending the sensing signal to the driving mechanism, and then control the print device to take the position of the third sensor as the initial printing position to start printing.

Furthermore, the driving mechanism may be further configured to:
  continuously detect operating states of the first sensor and the second sensor; and, if any sensor located in the predefined movement direction of the print device is detected to be faulty and cannot send the sensing signal to the driving mechanism, receive a movement instruction input by a user, and control the print device to move towards the sensor located in the predefined movement direction based on the movement instruction.

Furthermore, control the print device to move towards the sensor located in the predefined movement direction based on the movement instruction may comprise:
  obtaining input time period of the movement instruction, and controlling the print device to move at a predefined speed towards the sensor located in the predefined movement direction for the input time period.

Furthermore, the driving mechanism may be further configured to:

generate alert information corresponding to the malfunctioned sensor when a malfunction of at least one sensor is detected.

Furthermore, the at least one guide rail may include a first guide rail and a second guide rail, and the guide rails and the linear modular component may be arranged in parallel in such a manner that:

the first guide rail is arranged in parallel above the linear modular component, the second guide rail is arranged in parallel below the linear modular component, and the first guide rail corresponds to the second guide rail.

Furthermore, the guide rail may be provided at two ends respectively with a mechanical stop.

Furthermore, the third sensor may be a home sensor.

In the embodiments of the disclosure which provides the first sensor and the second sensor respectively at two ends of the linear modular component, when the printing device does not arrive at the position of the first sensor or the second sensor, the first sensor or the second sensor continuously sends sensing signals to the driving mechanism and thus the driving mechanism controls the printing device to continue its movement upon receiving the sensing signals, and when the printing device arrives at the position of the first sensor or the second sensor, the respective sensor stops sending sensing signals to the driving mechanism, and then the driving mechanism controls the printing device to stop its movement when the driving mechanism does not receive the sensing signals sent from the respective sensor. In such a case, it achieves prompt control of the printing device to stop its movement when it arrives at a certain sensor position or when a sensor malfunctions. Consequently, the printing device is effectively prevented from exceeding the predefined travel distance, and thus the risk of damage to the printing device can be greatly reduced.

Furthermore, in the embodiment of the disclosure, when a malfunction of the sensor located in the predefined movement direction is detected, the driving mechanism controls the print device to stop moving. Furthermore, a movement instruction input by the user can be received, and upon the movement instruction, the print device can be controlled to move towards the sensor positioned in the predefined movement direction. Consequently, it ensures that the print device can operate normally when the sensor malfunctions, and the risk of damage to the printing device caused by over travel can be greatly reduced.

Furthermore, in the embodiment of the disclosure, when the print device is activated, the print device can be positioned to the position of the third sensor without manual operation. Thus, it effectively reduces labor cost and greatly improves printing accuracy.

BRIEF DESCRIPTION OF THE DRAWINGS

The sole FIGURE is a structural schematic view illustrating a print control device according to an embodiment of the disclosure.

DETAILED DESCRIPTION OF ILLUSTRATED EMBODIMENTS

The technical solutions according to embodiments of the disclosure will be clearly and completely described below in conjunction with the drawings of the embodiments of the disclosure. The described embodiments are some but not all of the embodiments of the disclosure. Based on the described embodiments herein, those skilled in the art can obtain other embodiments without any inventive work, which should be within the scope of the disclosure.

It should be noted that, terms such as "first" and "second" used in the description are illustrative but are not intended to indicate or hint relative importance, or implicitly indicate a number of characteristics. Thus, the characteristics defined with "first" or "second" may indicate or hint one or more of such characteristics. Unless specified otherwise, "plurality" used in the description refers to two or more than two.

It should be noted that, unless defined or specified otherwise, terms such as "mount", "connect" and "attach" used in the description are intended to have meanings commonly understood in a broad sense. For example, "connect" may refer to fixedly connect, or detachably connect, or integrally connect; or mechanically connect, or electrically connect; or directly connect, or indirectly connect via an intermedium, or internally communicate between two components. The meanings of the terms used herein may be understood by those skilled in the art in accordance with specific conditions.

Referring to the sole FIGURE, a print control device is provided in an embodiment of the disclosure, which comprises: a linear modular component 1, a driving mechanism 2, and at least one guide rail 3.

In the embodiment, the print device 7 is disposed on the linear modular component 1. The driving mechanism 2 comprises a controller and a motor, and the driving mechanism 2 is configured to drive the linear modular component 1 to operate and enable the print device 7 to move along the guide rail 3.

The guide rail 3 and the linear modular component 1 are arranged in parallel, and the driving mechanism 2 is disposed on one end of the linear modular component 1.

In an embodiment of the disclosure, a plurality of guide rails 3 may be provided. For example, one guide rail 3 may be arranged above the linear modular component 1, and one guide rail 3 may be arranged below the linear modular component 1, such that the print device 7 can move stably during printing due to the two guide rails arranged above and below.

The linear modular component 1 is provided with a group of sensors, including a first sensor 4 and a second sensor 5.

The first sensor 4 and the second sensor 5 are respectively disposed at two ends of the linear modular component 1.

In the embodiment of the disclosure, the first sensor 4 and the second sensor 5 are respectively disposed at two ends of the linear modular component 1, the print device 7 is moveable back and forth on the linear modular component 1 between the first sensor 4 and the second sensor 5 so as to perform printing, and the first sensor 4 and the second sensor 5 serve to sense the position of the print device 7. As long as the print device 7 does not arrive at the position of the sensor, the sensor continuously sends sensing signals to the driving mechanism 2 and enables the driving mechanism 2 to keep controlling the print device 7 to move.

The driving mechanism 2 is configured to:

control the print device 7 disposed on the linear modular component 1 to move along the guide rail 3 in a predefined direction;

In an embodiment of the disclosure, the driving mechanism 2 is configured to control the print device 7 to move or not move, depending on whether or not the driving mechanism 2 receives a sensing signal from the first sensor 4 or the second sensor 5.

The group of sensors are configured to:
detect the position relationship between the print device 7 and the sensor located in the predefined movement direction during movement of the print device 7 in the predefined direction; if the print device 7 does not arrive at the position of the sensor located in the predefined movement direction, continuously send sensing signals to the driving mechanism 2 and enable the driving mechanism 2 to keep controlling the print device 7 to move in the predefined direction;

in an embodiment of the disclosure, the sensor located in the predefined movement direction may be the first sensor or the second sensor.

If the print device 7 arrives at the position corresponding to the sensor located in the predefined movement direction, the sensor located in the predefined movement direction stops sending any sensing signal to the driving mechanism 2, such that the print device 7 controlled by the driving mechanism 2 stops moving.

In an embodiment of the disclosure, both the first sensor 4 and the second sensor 5 operate in an always-on mode. If the print device 7 does not arrive at the position of the first sensor 4 or the second sensor 5, the first sensor 4 or the second sensor 5 in a turned-on state continuously sends sensing signals to the driving mechanism 2, such that the driving mechanism 2 which continuously receives the sensing signals controls the print device 7 to continue movement.

For example, if the print device 7 is set to move towards the first sensor 4, the driving mechanism 2 controls the print device 7 to keep moving towards the first sensor 4 when the driving mechanism 2 continuously receives sensing signals sent from the first sensor 4; and when the driving mechanism 2 does not receive the sensing signal from the first sensor 4, the driving mechanism 2 determines that the print device 7 arrives at the position of the first sensor 4 or the first sensor 4 malfunctions, and meanwhile controls the print device 7 to stop moving. In an embodiment of the disclosure, in the case that the print device 7 is set to move towards the first sensor 4, the control of the print device 7 by the driving mechanism 2 is independent from the sensing signal sent from the second sensor 5.

For example, if the print device 7 is set to move towards the second sensor 5, the driving mechanism 2 controls the print device 7 to keep moving towards the second sensor 5 when the driving mechanism 2 continuously receives sensing signals sent from the second sensor 5; and when the driving mechanism 2 does not receive the sensing signal from the second sensor 5, the driving mechanism 2 determines that the print device 7 arrives at the position of the second sensor 5 or the second sensor 5 malfunctions, and meanwhile controls the print device 7 to stop moving. In an embodiment of the disclosure, in the case that the print device 7 is set to move towards the second sensor 5, the control of the print device 7 by the driving mechanism 2 is independent from sensing signals sent from the first sensor 4.

In an embodiment of the disclosure, the print control device provides the linear modular component 1 which has two ends respectively arranged with the first sensor 4 and the second sensor 5. When the print device 7 does not arrive at the position of the first or second sensor, the first or second sensor continuously sends sensing signals to the driving mechanism 2, such that the driving mechanism 2 controls the print device 7 to continue movement when it continuously receives the sensing signals. When the print device 7 arrives at the position of one of the first sensor 4 and the second sensor 5, the one of the first sensor 4 and the second sensor 5 stops sending any sensing signal to the driving mechanism 2 such that the driving mechanism 2 controls the print device 7 to stop moving when it does not receive any sensing signal sent from the one of the sensors. In such a case, when the print device 7 arrives at a position of the sensor or a sensor malfunctions, the print device 7 can be timely controlled to stop moving, whereby the print device 7 can be effectively prevented from over travel, and the risk of damage to the print device 7 can be greatly reduced.

In an embodiment, the linear modular component 1 may further comprise a third sensor 6 disposed between the first sensor 4 and the second sensor 5, and the distance between the third sensor 6 and the second sensor 5 is a predefined value.

In an embodiment of the disclosure, the third sensor 6 may be a home sensor, and the third sensor 6 is disposed on the linear modular component 1 between the first sensor 4 and the second sensor 5. The third sensor 6 may be disposed next to the second sensor 5, or the third sensor 6 may be placed at a predefined value of distance from the second sensor 5. For example, the distance between the third sensor 6 and the second sensor 5 may be 10 mm, or the distance between the third sensor 6 and the second sensor 5 may be 15 mm, or the distance between the third sensor 6 and the second sensor 5 may be 20 mm.

In an embodiment of the disclosure, the second sensor 5 may be disposed at an end of the linear modular component 1 close to the driving mechanism 2, and first sensor 4 may be disposed at the other end of the linear modular component 1.

In an embodiment, the driving mechanism 2 may be further configured to:
control the print device 7 to move towards the second sensor 5 if receiving a sensing signal sent from the third sensor 6 when the print device is activated, and control the print device 7 to move towards the third sensor 6 when the print device 7 arrives at the position of the second sensor 5.

In the embodiment of the disclosure, in order to improve printing accuracy, the print device 7 needs to automatically perform zeroing to achieve positioning of the print device before printing. The automatic zeroing refers to positioning the print device 7 at the predefined original position before printing. In an embodiment of the disclosure, the predefined original position may be the position of the third sensor. In the embodiment of the disclosure, as the position of the third sensor 6 is the original position in each case where the print device 7 starts to print, each time the print device 7 is activated the print device 7 moves back to the position of the third sensor 6 and then starts to print.

As the print device 7 may finally move to any position on the linear modular component 1 after previous printing, in an embodiment of the disclosure, the position relationship between the print device 7 and the third sensor 6 may be determined by detecting whether or not the third sensor 6 sends a sensing signal.

In such a case, if the driving mechanism 2 can still receive sensing signals sent from the third sensor 6, it determines that the print device 7 is not at the position of the third sensor 6 at that moment. Thus, the driving mechanism 2 controls the print device 7 to move towards the second sensor 5. When the print device 7 arrives at the position of the second sensor 5, the driving mechanism 2 controls the print device 7 to move towards the third sensor 6.

When the third sensor 6 stops sending any sensing signal to the driving mechanism 2, the print device 7 is controlled to stop moving, and then the print device 7 is controlled to take the position of the third sensor 6 as the initial printing position to start printing.

In an embodiment of the disclosure, when the print device 7 moves to the position of the third sensor 6, the third sensor 6 stops sending any sensing signal to the driving mechanism 2, such that the driving mechanism controls the print device 7 to stop moving. Thus, the print device 7 is stopped at the position of the third sensor 6, and then the print device 7 can be controlled to start printing.

In an embodiment of the disclosure, when the print device 7 is activated, it is firstly positioned at the third sensor 6 and then starts perform printing, whereby the print device 7 can be controlled to realize automatic zeroing without manual operation. Thus, it effectively reduces labor cost, and greatly improves automatic zeroing accuracy and thus printing accuracy of the print device 7.

In an embodiment, the driving mechanism 2 may be further configured to:

- determine the third sensor 6 is faulty or not if not receiving any sensing signal sent from the third sensor 6 when the print device is activated;
- if the third sensor 6 is determined to be faulty, control the print device 7 to move to the position of the first sensor 4 or the second sensor 5 and then control the print device 7 to move based on a movement instruction input by a user;
- if the third sensor 6 is determined to be not faulty, control the print device 7 to move a predefined distance towards the first sensor 4 and then move towards the second sensor 5 until it arrives at the position of the third sensor 6 such that the third sensor 6 stops sending any sensing signal to the driving mechanism 2, and then control the print device 7 to take the position of the third sensor 6 as the initial printing position to start printing.

In the embodiment of the disclosure, if the driving mechanism 2 does not receive any sensing signal sent from the third sensor 6 when the print device 7 is activated, two situations may arise.

In a first case, the third sensor 6 is faulty and thus cannot send any sensing signal to the driving mechanism 2;

In a second case, the print device 7 is at the position of the third sensor 6 when it is activated.

For the first case, the driving mechanism 2 controls the print device 7 to move to the position of the first sensor 4 or the second sensor 5 and then control the print device 7 to move based on a movement instruction input by a user;

For the second case, the print device 7 may be controlled to move a predefined distance towards one of the sensors and then move in an opposite direction to the position of the third sensor 6. For example, the print device 7 may be controlled to move 50 mm towards the first sensor 4 and then move towards the second sensor 5 until it arrives at the position of the third sensor 6. That is, in such a case, the driving mechanism 2 may control the print device 7 to stop moving when it does not receive any sensing signal sent from the third sensor 6.

In an embodiment, the driving mechanism 2 is further configured to:

- continuously detect the operating state of the first sensor 4 and the second sensor 5; and, if the sensor located in the predefined movement direction of the print device 7 is detected to be faulty and cannot send any sensing signal to the driving mechanism 2, receive a movement instruction input by the user, and control the print device 7 to move towards the sensor located in the predefined movement direction based on the movement instruction.

In the embodiment of the disclosure, the controller of the driving mechanism 2 may continuously detect the operating state of the first sensor 4 and the second sensor 5. If the sensor located in the predefined movement direction of the print device 7 is detected to be faulty and cannot send any sensing signal to the driving mechanism 2, the driving mechanism 2 controls the print device 7 to stop moving. In the meantime, the driving mechanism 2 may receive a movement instruction input by the user to control the print device 7 to move.

For example, if the first sensor 4 is detected to be faulty and cannot send any sensing signal to the driving mechanism 2 when the print device 7 is set to move towards the first sensor 4, the driving mechanism 2 may control the print device 7 to stop moving and then force the print device 7 to move towards the first sensor 4 based on the movement instruction input by the user. In a specific implementation, two movement buttons may be provided, i.e., a first movement button for inputting a movement instruction to control the print device 7 to move towards the first sensor 4 and a second movement button for inputting a movement instruction to control the print device 7 to move towards the second sensor 5, which are connected with the driving mechanism 2.

It should be noted that, the print device 7 is driven to move by forward and reverse rotation of the motor of the driving mechanism 2, and the first movement button and the second movement button may be respectively configured to control the forward and reverse rotation of the motor. When the user presses one of the movement buttons, the driving mechanism 2 ignores the sensing signals sent from any sensor, and the movement instruction which is input through the movement buttons will take precedence on execution, thereby ensuring normal operation of the print device 7 in the event of abnormal signals of any sensor.

In an embodiment, control the print device 7 to move towards the sensor located in the predefined movement direction based on the movement instruction comprises:

- obtaining input time period of the movement instruction, and controlling the print device 7 to move at a predefined speed towards the sensor located in the predefined movement direction for the input time period.

In an embodiment of the disclosure, the input time period of the movement instruction may be the time period during which the print device 7 is forced to move. For example, if the user presses the first movement button for 1 second, the print device 7 is moved towards the first sensor 4 for 1 second; and if the user presses the second movement button for 1 second, the print device 7 is moved towards the second sensor 5 for 1 second.

In the embodiment of the disclosure, when a sensor malfunctions, the driving mechanism 2 can stop movement of the print device 7 towards the malfunctioned sensor and issue an alert of sensor malfunction. In such a case, the print control device activates the protection mechanism, such that it needs the movement instruction received from the user so as to control the movement of the print device 7. Consequently, the print device 7 can perform printing in a predefined movement direction or in the adjusted movement direction when the sensor malfunctions, whereby the print device 7 can be effectively prevented from over travel caused by sensor malfunction. Hence, it ensures work efficiency and meanwhile greatly reduces the risk of damage to the print device 7.

In an embodiment, the driving mechanism 2 is further configured to:
generate alert information corresponding to the malfunctioned sensor when a malfunction of at least one sensor is detected.

In the embodiment of the disclosure, the controller of the driving mechanism may be configured to detect operating states of all sensors of the print control device. Furthermore, an indicator light may be provided to indicate corresponding alert information. In particular:

3 indicator lights may be provided, including: the first indicator light, the second indicator light, and the third indicator light, which respectively correspond to the first sensor, the second sensor, and the third sensor. If the sensor malfunction is detected, the driving mechanism controls the indicator light which corresponds to the malfunctioned sensor to flash, to warn relevant personnel. For example, if the malfunctions of the first sensor and the second sensor are detected, the driving mechanism controls the first indicator light and the second indicator light to turn red and flash.

In an embodiment, the at least one guide rail 3 includes the first guide rail and the second guide rail, and the configuration that the guide rail 3 and the linear modular component 1 are arranged in parallel includes:
the first guide rail is arranged in parallel above the linear modular component 1, the second guide rail is arranged, corresponding to the first guide rail, in parallel below the linear modular component 1.

In the embodiment of the disclosure, due to the first guide rail arranged above the print device 7 and the second guide rail arranged below the print device 7, the print device 7 can move along both the first guide rail and the second guide rail, thereby effectively improving the movement stability of the print device 7 and thus the accuracy of the movement control of the print device 7.

In an embodiment, the guide rail 3 may be provided at two ends respectively with a mechanical stop 8.

In the embodiment of the disclosure, due to the mechanical stops 8 respectively disposed at two ends of the guide rail 3, the print device 7 can be prevented from over travel to cause damage during the printing movement on the guide rail 3.

The embodiments of the disclosure may have advantages as follows.

In the embodiments of the disclosure which provides the first sensor 4 and the second sensor 5 respectively at two ends of the linear modular component 1, when the printing device does not arrive at the position of the first sensor 4 or the second sensor 5, the first sensor 4 or the second sensor 5 continuously sends sensing signals to the driving mechanism 2 such that the driving mechanism 2 controls the printing device 7 to continue its movement upon receiving the sensing signals, and when the printing device 7 arrives at the position of the first sensor 4 or the second sensor 5, the respective sensor stops sending sensing signals to the driving mechanism 2, and then the driving mechanism 2 controls the printing device 7 to stop its movement when the driving mechanism 2 does not receive the sensing signals sent from the respective sensor. In such a case, it achieves prompt control of the printing device 7 to stop its movement when it arrives at a certain sensor position or a sensor malfunctions. Consequently, the printing device 7 is effectively prevented from exceeding the predefined travel distance, and thus the risk of damage to the printing device 7 can be greatly reduced.

Furthermore, in the embodiment of the disclosure, when a malfunction of the sensor located in the predefined movement direction is detected, the driving mechanism controls the print device to stop moving. Furthermore, a movement instruction input by the user can be received, and upon the movement instruction, the print device can be controlled to move towards the sensor positioned in the predefined movement direction. Consequently, it ensures that the print device 7 can operate normally when the sensor malfunctions, and the risk of damage to the printing device 7 caused by over travel can be greatly reduced.

Furthermore, in the embodiment of the disclosure, when the print device 7 is activated, the print device 7 can be positioned to the position of the third sensor 6 without manual operation. Thus, it effectively reduces labor cost and greatly improves printing accuracy.

All the above are merely some preferred embodiments of the disclosure. It should be noted that the disclosure is intended to cover equivalent arrangements and various modifications made by those skilled in the art without departing from the principle of the disclosure.

The invention claimed is:

1. A print control device, comprising:
a linear modular component, a driving mechanism, and at least one guide rail;
wherein the guide rail and the linear modular component are arranged in parallel, and the driving mechanism is disposed on one end of the linear modular component,
a group of sensors including a first sensor and a second sensor are disposed on the linear modular component,
wherein the first sensor and the second sensor are respectively disposed at two ends of the linear modular component;
the driving mechanism is configured to:
control a print device disposed on the linear modular component to move along the guide rail in a predefined movement direction; and
the group of sensors are configured to:
detect a position relationship between the print device and the sensor located in the predefined movement direction during movement of the print device in the predefined movement direction; if the print device does not arrive at a position of the sensor located in the predefined movement direction, continuously send a sensing signal to the driving mechanism and enable the driving mechanism to control the print device to move in the predefined movement direction; and if the print device arrives at the position of the sensor located in the predefined movement direction, the sensor located in the predefined movement direction stops sending the sensing signal to the driving mechanism and enable the driving mechanism to control the print device to stop movement; and
the driving mechanism is further configured to: continuously detect operating states of the first sensor and the second sensor; and, if any sensor located in the predefined movement direction of the print device is detected to be faulty and cannot send the sensing signal to the driving mechanism, receive a movement instruction input by a user, and control the print device to move towards the sensor located in the predefined movement direction based on the movement instruction.

2. The print control device according to claim 1, wherein the linear modular component further comprises a third sensor disposed between the first sensor and the second sensor, and a distance between the third sensor and the second sensor is a predefined value.

3. The print control device according to claim 2, wherein the driving mechanism is further configured to:
   control the print device to move towards the second sensor if receiving the sensing signal sent from the third sensor when the print device is activated, and control the print device to move towards the third sensor when the print device arrives at a position of the second sensor; and
   when the third sensor stops sending the sensing signal to the driving mechanism, control the print device to stop movement and then take a position of the third sensor as an initial printing position to start printing.

4. The print control device according to claim 3, wherein the driving mechanism is further configured to:
   if not receiving the sensing signal sent from the third sensor when the print device is activated, determine the third sensor is faulty or not;
   if the third sensor is determined to be faulty, control the print device to move to the position of the first sensor or the second sensor and then control the print device to move based on a movement instruction input by a user; and
   if the third sensor is determined to be not faulty, control the print device to move a predefined distance towards the first sensor, then move towards the second sensor until arriving at the position of the third sensor such that the third sensor stops sending the sensing signal to the driving mechanism, and then control the print device to take the position of the third sensor as the initial printing position to start printing.

5. The print control device according to claim 1, wherein control the print device to move towards the sensor located in the predefined movement direction based on the movement instruction comprises:
   obtaining input time period of the movement instruction, and controlling the print device to move at a predefined speed towards the sensor located in the predefined movement direction for the input time period.

6. The print control device according to claim 1, wherein the driving mechanism is further configured to:
   generate alert information corresponding to the malfunctioned sensor when a malfunction of at least one sensor is detected.

7. The print control device according to claim 1, wherein the at least one guide rail includes a first guide rail and a second guide rail, and the guide rails and the linear modular component are arranged in parallel in such a manner that:
   the first guide rail is arranged in parallel above the linear modular component, the second guide rail is arranged in parallel below the linear modular component, and the first guide rail corresponds to the second guide rail.

8. The print control device according to claim 1, wherein the guide rail is provided at two ends respectively with a mechanical stop.

9. The print control device according to claim 2, wherein the third sensor is a home sensor.

* * * * *